United States Patent Office 3,427,793
Patented Feb. 18, 1969

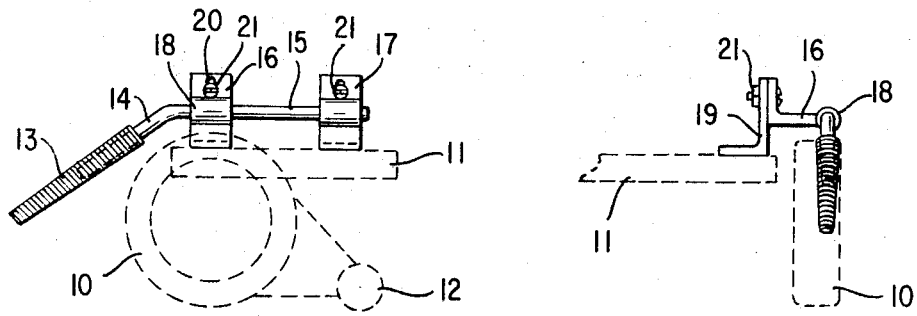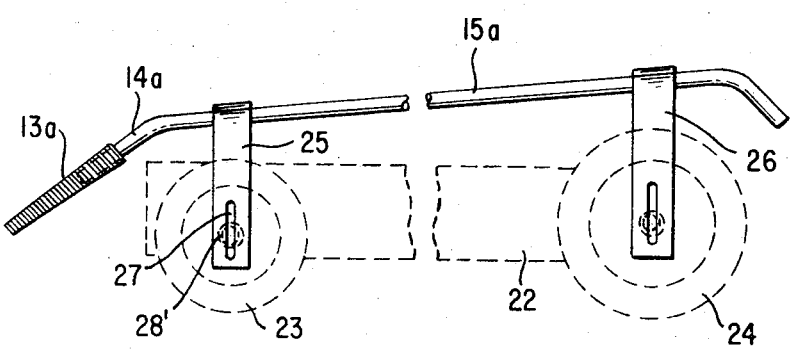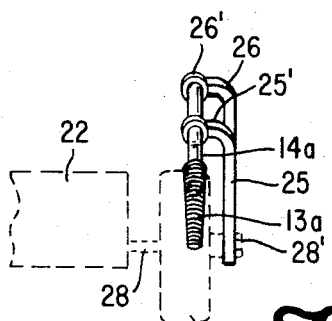

3,427,793
TRIM LIFT GUARD FOR LAWNMOWERS
Charles Greulich, R.D. 1, Bellevue, Ohio 44811
Filed Oct. 14, 1965, Ser. No. 495,861
U.S. Cl. 56—255                    1 Claim
Int. Cl. A01d 55/18

ABSTRACT OF THE DISCLOSURE

A trim lift guard for lawnmowers having a downwardly and forwardly inclined bar portion arranged in advance of a front ground wheel of the mower and having at it's front end a resilient feeler in the form of a tapered helical coiled spring with a smaller end outermost for engaging and lifting flowers, vines and the like out of the path of the mower. Integral with the bar portion is a rearwardly and upwardly inclined bar along which the flowers, vines and the like travel as the mower advances. The bar is attached to the mower and is capable of up and down adjustment.

---

This invention relates generally to lawnmowers, and an object is to produce a simple and inexpensive trim lift guard which can be readily and conveniently attached to lawn mowers, whether of the so-called reel or rotary type, for lifting the ends of branches, flowers, vines, shrubs and the like, out of the path of the mower, thereby to enable the mower to trim closely without interference.

Another object is to produce a lift guard of the above character which has adequate rigidity to achieve its purpose, but is sufficiently flexible to yield upon encountering a solid or immovable object.

Other objects of the invention will hereinafter appear and, for purposes of illustration but not of limitation, embodiments of the invention are shown on the accompanying drawings, in which:

FIGURE 1 is a side elevation of a trim lift guard mounted upon a reel-type mower, the latter being shown by broken lines;

FIGURE 2 is an end elevation of the trim lift guard and shows a portion of a reel-type mower in broken lines;

FIGURE 3 is a side elevation of an alternate form of a trim lift guard for use on so-called rotary type mowers, the latter being shown by broken lines; and FIGURE 4 is a front end elevation of the trim lift guard shown in FIGURE 3, a portion of the so-called rotary type mower being shown in broken lines.

The illustrated embodiment of the invention shown in FIGURES 1 and 2 shows a reel-type mower equipped with the usual horizontally arranged rotary cutting blade assembly and provided with the usual laterally spaced ground engaging wheels 10 suitably supported by a horizontally arranged frame 11. In rear of the ground engaging wheel 10 is the usual trailing ground engaging roller 12. For a lawnmower of this type, the trim lift guard is in the form of a tapered helical coiled spring 13 which inclines forwardly and downwardly with the smaller end of the spring at the lower end. The upper end of the coil spring 13 fits into and is welded to a downwardly inclined front end portion 14 of a supporting bar, the upper portion 15 of which is horizontally disposed. Preferably the trim lift guard 13 is disposed at an angle of the order of 35° to 45° to the horizontal. Preferably the guard 13 should be mounted as close as possible to the ground engaging wheel 10 of the mower, such, for example, as depicted on FIGURE 2.

The horizontal portion 15 of the supporting bar is carried by a pair of longitudinally spaced angle brackets 16 and 17. Each of these brackets has a sleeve 18 at the outer end through which the bar 15 extends. The angle brackets 16 are attached respectively to angle brackets 19 on the mower frame 11. In the vertical portions of the angle brackets 16 and 17 are vertical slots 20 through which bolt and nut assemblies 21 extend, thereby enabling the feeler or lift trim guard 13 to be adjusted vertically. It will be understood that the support rod 15 is fixedly secured by welding to each of the sleeves 18, thereby providing a rigid support which at all times disposes the trim guard 13 in the desired position of use.

The embodiment shown on FIGURES 3 and 4 is adapted for use on a so-called rotary mower in which the cutter blades rotate on a vertical axis. In this instance, the mower and its wheels are shown by broken lines in which the shroud or casing for the cutter blades is shown at 22. At the forward end of the casing are ground engaging wheels 23 and at the rear of the casing are ground engaging wheels 24. The tapered helical coiled spring lift guard is indicated at 13a which is welded at its inner end to the downwardly inclined end portion 14a of a supporting bar which has a horizontally inclined portion 15a. The supporting bar is carried by a pair of vertically disposed bracket arms 25 and 26 arranged respectively adjacent the front and rear wheels of the mower. At the upper end of the bracket arm 26 is a sleeve 26' through which the bar portion 15a is slidable. The bracket arm 26 has at its upper end a sleeve 26' in which the bar 15a is slidable thereby to accommodate for different spacings between the front and rear wheels of the mower. In the lower portion of each of the bracket arms is a vertical slot 27 to receive the end portion of the axles 28 which has an outer threaded end portion to receive a nut 28'. Thus the slotted portions of the bracket arms 25 and 26 can be slipped over the ends of the axles 28 and retained in position by the ordinary nut 28' which is applied to the threaded end portion of the respective axles.

From the above description, it will be manifest that I have produced an exceedingly simple and efficient trim lift guard for attachment either to a reel-type or rotary-type lawnmower. This is attached to the trim side of a rotary mower, or to both sides of a reel mower, above the ground engaging wheels and with the nose or outer end portion extending in front of the wheel at an angle of 35° to 45° to the surface. When mowing close to the edges of flower beds, evergreens, vines, shrubs and the like, the end of the nose slides under the objects and lifts them up over the wheel so that they slide past the mower. This prevents them from being trampled under the wheels and into the mower and being cut off. Instead of employing a coil spring as above described, a flexible rubber feeler may be employed for the purpose, the same having adequate resiliency for the purpose intended.

Numerous changes in detail of construction, arrangement and choice of materials may be effected without departing from the spirit of the invention, especially as defined in the appended claim.

I claim:

1. A trim lift guard for a rotary mower in which the cutter blades rotate on a vertical axis and the mower has fore and aft ground engaging wheels, said guard comprising:

a downwardly and forwardly inclined bar portion disposed in advance of a front ground engaging wheel, a resilient feeler in the form of a tapered helical coil spring fixed to the end portion of said bar portion and with the smaller end outermost and spaced above the ground thereby to engage and lift flowers, vines and the like out of the path of the mower, a rearwardly and upwardly inclined bar integral with said bar portion and terminating beyond a rear wheel of the mower whereby such flowers, vines and the like travel up and along said bar portion and bar as the mower advances, a mounting for attaching said bar to the mower, and means for effecting vertical adjustment of said mounting for raising or lowering said bar and bar portion.

References Cited
UNITED STATES PATENTS

| | | | |
|---|---|---|---|
| 1,147,814 | 7/1915 | Petsch | 172—517 X |
| 2,551,744 | 5/1951 | Huggler | 280—160 |
| 2,597,981 | 5/1952 | Fishburn | 56—314 X |
| 3,147,568 | 9/1964 | Inhofer | 47—1.7 |

ABRAHAM G. STONE, *Primary Examiner.*

R. C. HARRINGTON, *Assistant Examiner.*